United States Patent
Nishigaki

(10) Patent No.: US 7,431,637 B2
(45) Date of Patent: Oct. 7, 2008

(54) SAW-SETTING MACHINE FOR SAW CHAIN

(75) Inventor: Takanobu Nishigaki, Miki (JP)

(73) Assignee: Nishigaki Industrial Co., Ltd., Hyogo (JP)

( * ) Notice: Subject to any disclaimer, the term of this patent is extended or adjusted under 35 U.S.C. 154(b) by 257 days.

(21) Appl. No.: 10/559,757

(22) PCT Filed: Dec. 22, 2003

(86) PCT No.: PCT/JP03/16494

§ 371 (c)(1),
(2), (4) Date: Dec. 5, 2005

(87) PCT Pub. No.: WO2005/061163

PCT Pub. Date: Jul. 7, 2005

(65) Prior Publication Data

US 2006/0128284 A1 Jun. 15, 2006

(51) Int. Cl.
B24B 23/00 (2006.01)
B23D 63/16 (2006.01)

(52) U.S. Cl. ............... 451/358; 451/120; 451/124; 451/233; 451/234; 451/241; 451/419; 451/420; 451/439; 451/545; 76/80.5; 76/74; 76/36; 76/37; 76/25.1

(58) Field of Classification Search ........... 451/358, 451/419, 420, 193, 349, 124, 120, 241, 233, 451/234, 439, 545; 76/80.5, 74, 25.1, 36, 76/37
See application file for complete search history.

(56) References Cited

U.S. PATENT DOCUMENTS 2,568,062 A * 9/1951 Fitch .................... 76/41

(Continued)

FOREIGN PATENT DOCUMENTS

JP 57-186227 11/1982

(Continued)

Primary Examiner—Joseph J. Hail, III
Assistant Examiner—Robert Scruggs
(74) Attorney, Agent, or Firm—Apex Juris, pllc; Tracy M Heims

(57) ABSTRACT

It is to provide a saw chain sharpener such that while a saw chain is clamped at both ends by a holding plate, which is supported forward of a handy type electric motor, so as to stabilize its sharpening posture, a grinding tool such as a round rod-shaped grinding tool or a round rod-shaped grindstone, which is attached to an end of the electric motor, is rotated at a high speed so as to sharpen, at a side thereof, the saw chain efficiently. A support member is projected forward from a sharpener body which is formed such that a round shaft-shaped grinding tool for grinding is attached to an end of a handy type electric motor. A holding plate which has a shape to be able to straddle and support an upper part of the saw chain, and which has an opening formed at a center thereof to make it possible to watch a grinding location from above, and further which is formed to extend lengthwise in a direction along the saw chain, is supported on an attachment plate attached to a front end portion of the support member so as to be horizontally rotatable in a certain range for orientation to align with a sharpening angle of a cutter blade positioned left or right of the saw chain. Further, a projecting portion for fixing a cutting edge to define an accurate cutting edge angle is provided on the attachment plate.

1 Claim, 6 Drawing Sheets

U.S. PATENT DOCUMENTS

| | | | | |
|---|---|---|---|---|
| 2,704,948 A | * | 9/1955 | Le Grand | 76/41 |
| 2,855,808 A | * | 10/1958 | Samson | 76/36 |
| 2,932,993 A | * | 4/1960 | Weatherly et al. | 76/36 |
| 3,172,307 A | | 3/1965 | Kephart, Jr. | |
| 3,354,753 A | * | 11/1967 | Kennemore | 76/37 |
| 3,768,341 A | * | 10/1973 | Fitzpatrick | 76/31 |
| 3,905,118 A | * | 9/1975 | Ballew | 33/202 |
| 4,131,038 A | | 12/1978 | Beerens | |
| 4,242,926 A | * | 1/1981 | Anton | 76/80.5 |
| 4,412,463 A | * | 11/1983 | Beerens | 76/36 |
| 4,440,045 A | * | 4/1984 | Aksamit | 76/80.5 |
| 4,566,511 A | * | 1/1986 | Robinson | 144/48.6 |
| 4,594,919 A | * | 6/1986 | Southard | 76/36 |
| 4,727,776 A | * | 3/1988 | Granberg | 76/80.5 |
| 2006/0137489 A1 | * | 6/2006 | Nishigaki | 76/80.5 |

FOREIGN PATENT DOCUMENTS

JP  61-24121  2/1986

\* cited by examiner

SAW-SETTING MACHINE FOR SAW CHAIN

TECHNICAL FIELD

The present invention relates to a saw chain sharpener in which a round rod-shaped grinding tool attached to an end of an electric motor is rotated to grind and thereby sharpen, at a side portion thereof, a cutting edge of a cutter blade of a saw chain.

BACKGROUND ART

As a conventional technology of a saw chain sharpener, an upper blade grinding equipment for a chainsaw, for example, described in Japanese Laid-open Utility Model Publication Sho 61-24121 can be mentioned. This grinding equipment has: a holder 9 formed of a small motor; a rod-shaped grindstone 11 which is attached to a chuck 10 at an end of the holder 9 and can be rotated by a motor; a ring member 14 attached to an attachment member 12 at an end portion of the holder 9; a holding body 13 having a cover plate 16 extending from the ring member 14 in parallel with the grindstone 11 at both ends of the grindstone 11; and a grindstone retainer 19 having a retaining rod 20 which is fixed to an end portion of the cover plate of the holding body 13 by a fixing member 15, and which is opposed to the grindstone 11 and fixed at a free position on the same center axis as the grindstone.

This upper blade grinding equipment for a chainsaw is used in a procedure: that the holder 9 is held by a hand; that the rod-shaped grindstone 11 is rotated by the motor drive so as to bring the cover plate 16 of the holding body 13 into contact on a chain body 1; that a retaining rod 8 and the retaining rod 20 is brought into contact with an upper blade and upper blade 8 of a cutter blade link 2 so as to define a sharpening angle; and that thereafter a front end of the upper blade and the upper blade 8 are sharpened by being ground with the rotating rod-shaped grindstone 11 at a position where the entire equipment is shifted forward along the sharpening angle.

As another conventional technology, a saw chain sharpener described in Japanese Laid-open Utility Model Publication Sho 57-186227 can be mentioned, which does not need a grinding tool. This sharpener is constructed in a manner: that a cylinder-shaped grindstone 3 is attached to an end portion of a drive shaft of a motor 2; that attached to a lower front part of the motor 2 is an angle adjustment plate 1 which has a substantial pentagon-shape as seen in plan view, two sides of which at a front end are bent vertically downward to form front plate portions; and that a depth adjustment plate 6 is pivotally supported by a front end of each front plate portion of the angle adjustment plate 1 so as to be adjustable in an up-down direction.

This sharpener is used in a procedure: that the grindstone 3 is rotated by the motor; that either of the front surfaces of the angle adjustment plate 1 is brought into contact along a side portion of the saw chain so as to align the orientation of the grindstone 3 with a sharpening angle of an upper blade; and that a lower surface of the depth adjustment plate 6 is brought into contact with an upper end of the saw chain, and the height of the depth adjustment plate 6 is adjusted so as to set the grindstone 3 at an optimum height, whereby the sharpening is done the grindstone 3.

However, when using the above described grinding equipment or the sharpener, a hand is used to hold the holder or the motor 2 so as to place the cover plate 16 or the angle adjustment plate 1 on the saw chain. This has caused a problem that although the holding of the holder or the motor 2 by hand is likely to cause instability in itself, there is no support, and that the mere placing of the cover plate 16 or the angle adjustment plate 1 on the saw chain is insufficient to stabilize the posture of the grinding equipment or the sharpener.

Thus, conventionally, there has been a problem that it is difficult to do an accurate sharpening or sharpening which is aligned with a sharpening angle, so that the hand gets tired, and the work efficiency gradually decreases.

DISCLOSURE OF INVENTION

The present invention is to solve the above problems that the conventional technologies has had, and it is an object of the present invention to provide a saw chain sharpener that sharpens a cutting edge of a cutter blade, which forms a part of a saw chain, in a manner that while the saw chain is clamped at both ends by a holding plate, which is supported forward of a handy type electric motor, so as to stabilize its sharpening posture, a grinding tool such as a round rod-shaped grinding tool or a round rod-shaped grindstone, which is attached to an end of the electric motor, is rotated at a high speed so as to sharpen, at a side thereof, the saw chain efficiently.

To achieve the above problems, the present invention provides a saw chain sharpener comprising: a sharpener body with an electric motor; a round shaft-shaped grinding tool attached to an end of the electric motor; a support member projected forward from the sharpener body; a projecting portion provided on a front end portion of the support member or on an attachment plate attached to the front end portion of the support member; and a holding plate attached forward of the saw chain sharpener and having a shape to be able to straddle and support an upper part of a saw chain, the holding plate having a vertical plate face having a long left-to-right length extending in a direction along the saw chain, an upper plate face placed on the upper part of the saw chain, and opposing vertical plate surfaces formed at leftward and rightward locations of upper plate face. The holding plate is supported on the front end portion of the support member or on the attachment plate so as to be horizontally rotatable and be aligned in orientation with a sharpening angle of a cutter blade positioned left or right of the saw chain to grind the cutter blade. The saw chain is clamped at both ends by a lower part face of the vertical plate face and the opposing vertical plate surfaces. The upper plate surface of the holding plate has an opening formed at a center thereof so as to make it possible to watch the grinding tool and the cutter blade from above. The projecting portion having a thin width shape is aligned in height with the upper plate face of the holding plate, in which the projection portion fixes a cutting edge of the cutter blade to define an accurate cutting edge angle and presses an upper blade of the cutter blade from above to prevent the upper blade from wobbling caused by grinding.

Using the sharpener of the present invention, sharpening is done by first horizontally pivoting the holding plate to a restricted position in either left or right direction relative to the sharpener body. Subsequently, the holding plate is placed to straddle and support (fitted into and placed on from above) the upper part of the saw chain from above for position alignment to make it possible to watch an upper blade, to be sharpened, of the cutter blade of the saw chain from above the opening of the holding plate, and to align a side of the grinding tool with the sharpening angle of the upper blade. Then, the side of the grinding tool, rotated at a high speed by the electric motor, is brought into contact along the cutting edge for grinding, while the position, posture and orientation of the sharpener are secured by continuing to apply a force to the holding plate in the horizontal direction and by clamping the saw chain between a front and a back face of the holding plate.

Here, cutting edge refers to a combination of a cutting edge of a front end and a cutting edge formed on a back edge of a curved portion in the upper blade, while sharpening refers to grinding of the cutting edge in alignment with the sharpening angle and cutting edge angle of the cutter blade.

The electric motor to be used is to be driven by a home AC power supply for each country and each region, or by a rechargeable battery. The grinding tool to be used is to be a round rod-shaped file or a metal shaft with particles of e.g. a grindstone fixed on periphery. The sharpening is done by bringing a side of the grinding tool, rotated at a high speed, into contact with the cutting edge.

When sharpening, the holding plate is brought to a state where it has been horizontally pivoted to a stop position to restrict the horizontal pivot relative to the sharpener body. This makes it possible to stabilize the sharpener, and to reduce wobbling of the sharpener when sharpening, and further to reduce position alignment errors in the sharpening angle and cutting edge angle, since the holding plate used in the present invention, in particular, extends lengthwise left to right. Thus, an accurate sharpening angle can be secured. Further, when sharpening, a side edge of the projecting portion provided on the front end portion of, or on the attachment plate attached to the front end portion of, the support member is aligned, for sharpening, with the cutting edge angle of the cutter blade, thereby enabling further accurate sharpening work.

Note that although the optimum holding plate is one that is supported on the attachment plate, attached to the end of the support member, so as to be horizontally pivotable, it is also possible to bend an end of the support member sideward, and to attach the holding plate to the thus bent portion. Thus, the projecting portion is provided from an end of the support member or the attachment plate, along a side edge of the grinding tool, to a position that is in accurate positional relationship for sharpening.

The saw chain sharpener according to the present invention enables high quality sharpening, using a handy type electric motor. In particular, the holding plate is provided to straddle and support an upper part of the saw chain, and it is designed to be able to sharpen with the electric motor held by a hand being turned around in the horizontal direction, either left or right, and with a posture to clamp the saw chain at both ends between a front face and a back face of the holding plate. As a result, it becomes possible to stabilize the entire sharpener, and do sharpening in a state with substantially no wobbling.

Further, by just turning around the holding plate to a limit of a range, either left or right, relative to the sharpener body in alignment with the left-to-right symmetry of the orientations of the sharpening angles of the left and right cutter blades, it becomes possible to align it with grinding or abrading, namely sharpening, of their cutting edges.

Furthermore, a projecting portion for fixing a cutting edge to define an accurate cutting edge angle is provided on the front end portion of the support plate or on an attachment plate, if the attachment plate is attached to the front end portion of the support plate, whereby it becomes possible to control fine adjustment to align a side edge of the projecting portion with the sharpening angle of a cutter blade, and consequently to enable a more accurate sharpening of the cutter blade.

BRIEF DESCRIPTION OF DRAWINGS

FIG. 2(a) is a plan view similarly showing its main part, while

FIG. 3(a) is a cross-sectional side view showing the sharpener of the embodiment of the present invention, while

FIG. 4(b) is a plan view showing its main part in the state in which it is used, while

FIG. 5(a) is a plan view showing a state in which the sharpener body has been turned around to the other orientation, while

BEST MODE FOR CARRYING OUT THE INVENTION

A best mode for carrying out the present invention has a basis construction as follows:

(1) A sharpener body is formed such that a round shaft-shaped grinding tool for grinding is attached to an end of a drive shaft of a handy type electric motor.

(2) A support member is projected forward from a side of a front part of the electric motor.

(3) A holding plate which has a shape to be able to straddle and support an upper part of a saw chain, and which has an opening formed at a center thereof to make it possible to watch a grinding location from above, and further which is formed to extend lengthwise in a direction along the saw chain, is supported on a lower part of a front end of the support member so as to be horizontally rotatable in a certain range.

(4) When the holding plate is horizontally rotated to a limit of the range and set on the saw chain, the grinding tool becomes oriented to align with a sharpening angle of either left or right cutter blade of the saw chain.

(5) A projecting portion, which has an accurate positional relationship with the grinding tool, is provided on a front end of, or on an attachment plate attached to the front end of, the support member.

Embodiment

Figure 1:
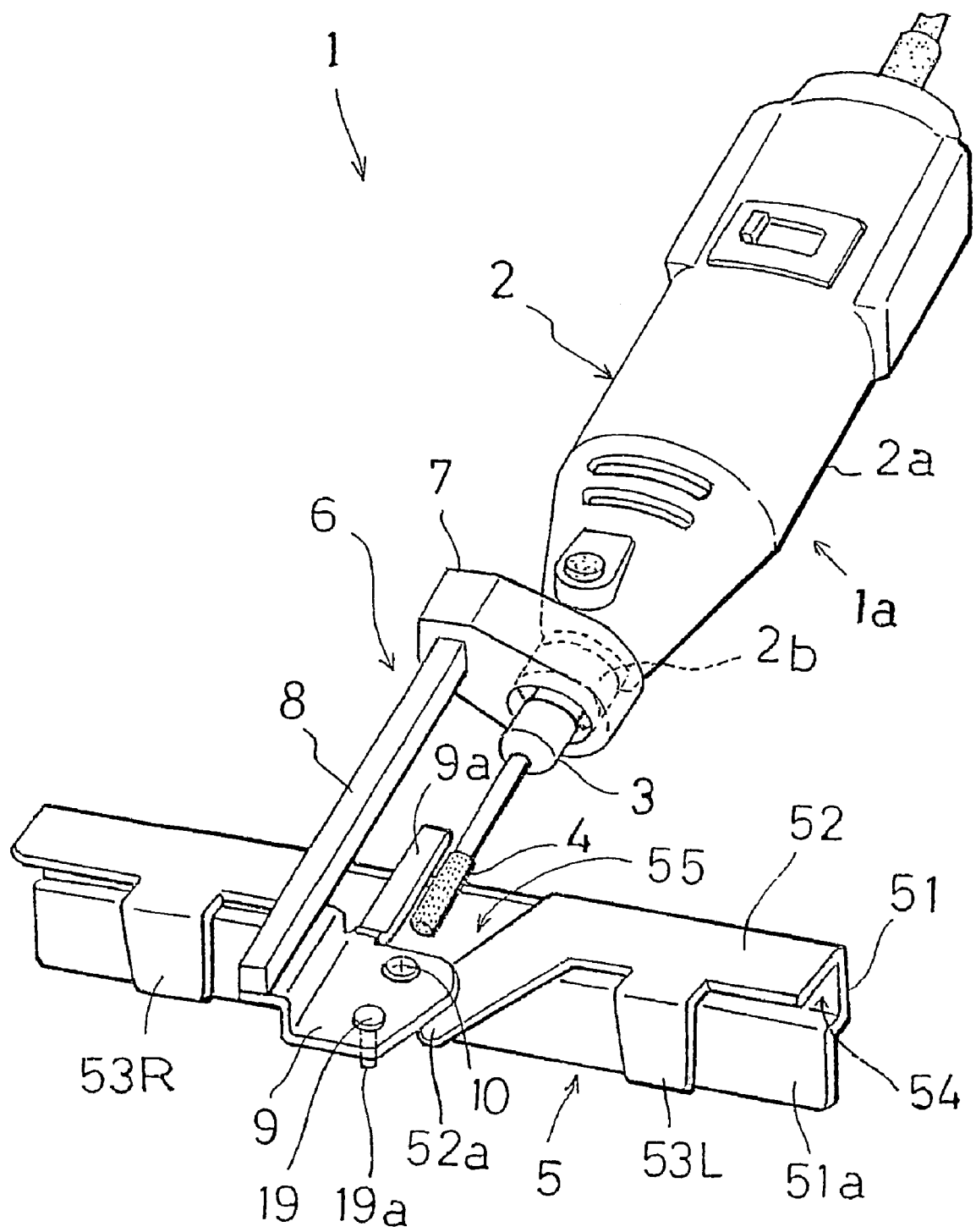
FIG. 1 is a perspective view showing a saw chain sharpener according to an embodiment of the present invention.
Figure 2A:
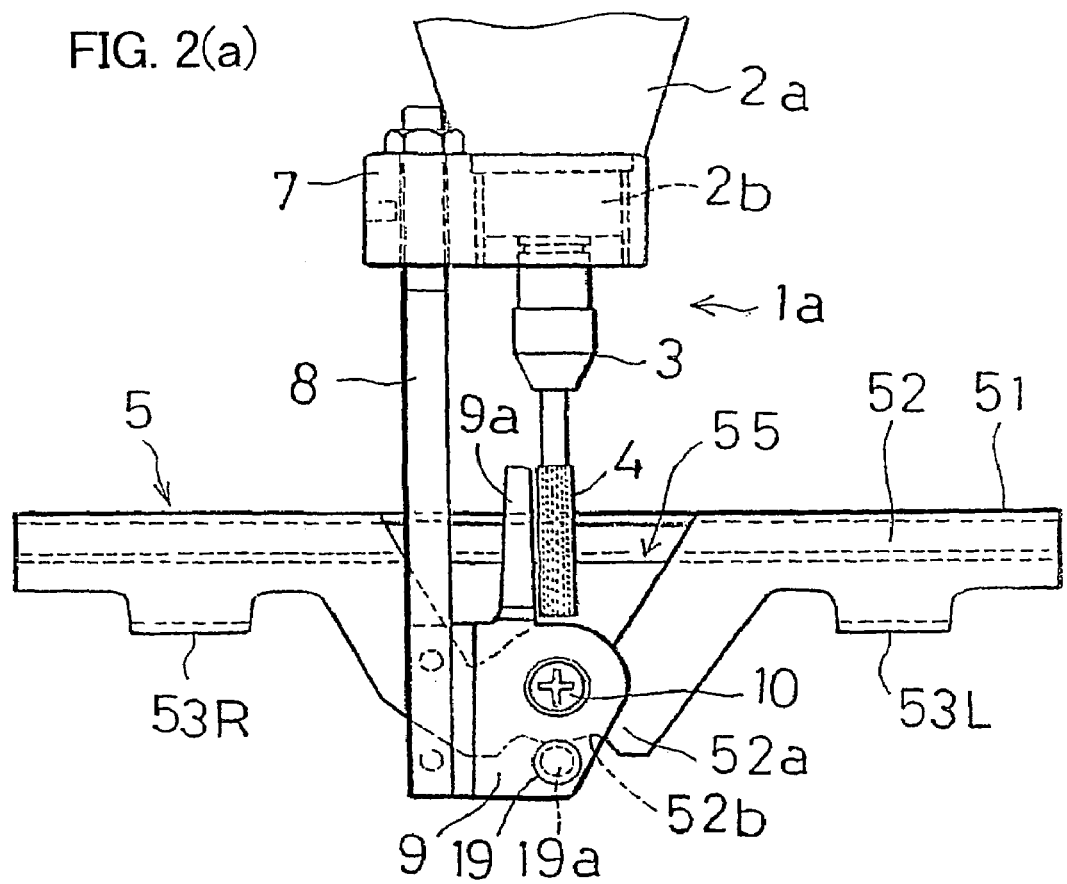
Figure 3A:
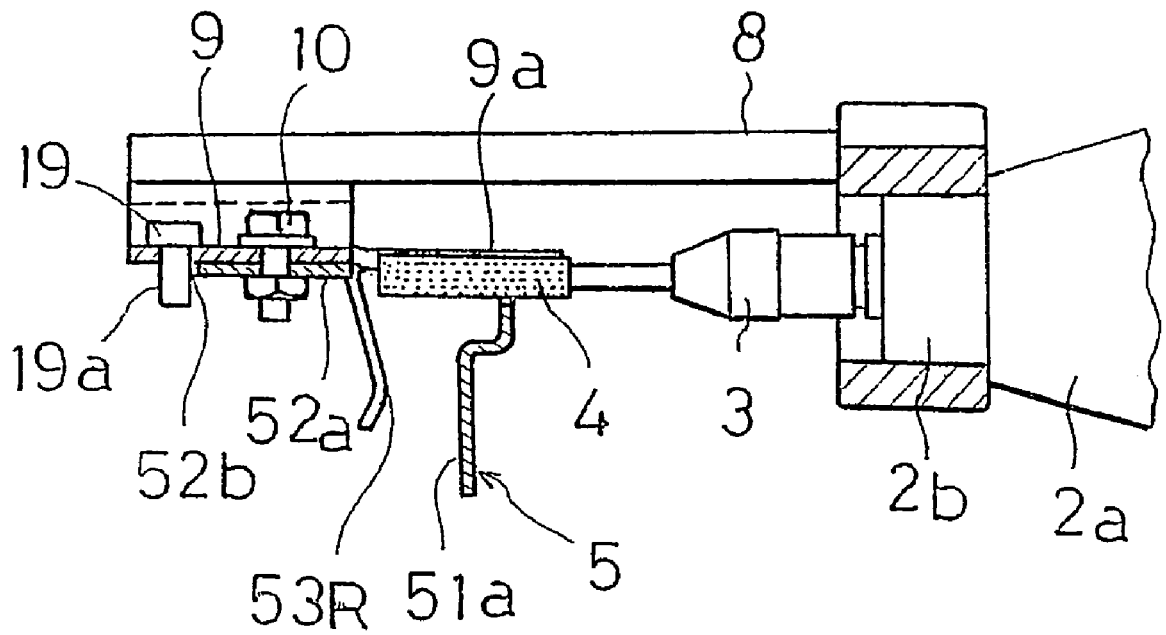
Figure 3B:
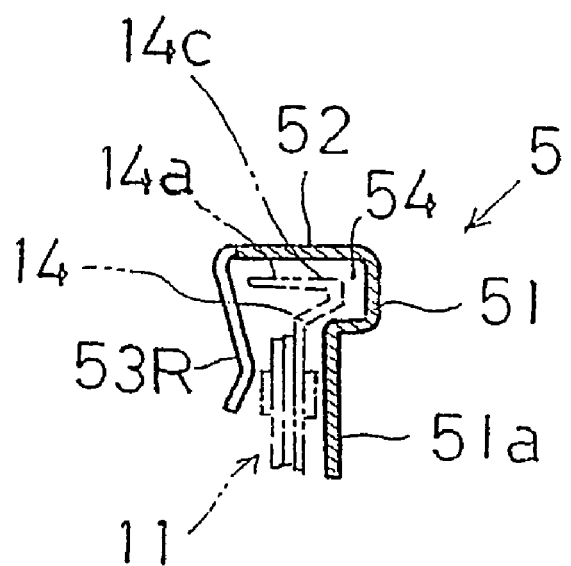
FIG. 3(b) is a cross-sectional side view showing a holding plate.

FIG. 1 is a perspective view showing a saw chain sharpener according to an embodiment of the present invention, and FIG. 2(a) is a plan view showing its main part, while (b) is a bottom view similarly showing the main part. FIG. 3(a) is a cross-sectional side view showing the sharpener of the embodiment, while (b) is a cross-sectional side view showing a holding plate.

The sharpener 1 according to the embodiment of the present invention as shown in these drawings comprises: a sharpener body 1a with an electric motor 2 which is a handy type, and which is driven by a home AC power supply for each country and each region, and further which has a round rod-shaped grinding tool 4 attached, by a chuck 3, to an end of a drive shaft thereof; a holding plate 5 for fixing the sharpener body 1a to the saw chain; and a support member 6 for connecting the electric motor 2 to the holding plate 5 to be horizontally pivotable.

Integrally combined as the support member 6 are: a thick wall ring-shaped base 7 fixed to a front part 2b of a case member 2a of the electric motor 2; a rod 8 projected forward from an upper location of a front surface of the base 7; and an attachment plate 9 projected from an end portion of the rod 8 to a position in front of the grinding tool 4. The attachment plate 9 has a shape such that it has a projecting portion 9a, having a thin width shape, projected backward from a substantially central location of a back end thereof. One side edge of the projecting portion 9a is positioned in alignment with an accurate sharpening angle along a side edge of the grinding tool 4.

An attachment plate face 52a of the holding plate 5 is fixed by a screw 10 to a lower surface of the attachment plate 9 so that the entire holding plate 5 is supported to be horizontally pivotable in a certain range.

The holding plate 5 has: a vertical plate face 51 having a long left-to-right form; an upper plate face 52 formed by bending an upper end of the vertical plate face 51 perpendicularly forward; and opposing vertical plate surfaces 53L, 53R formed by downwardly bending portions of an end of the upper plate face 52 at its leftward and rightward locations, respectively, so that the upper plate face 52 serves as a standing part in the holding plate 5 to press a side of the saw chain on its far side. Further, a lower part face 51a along the vertical plate face 51 is stepped forward slightly to serve as a face to contact along a side of the saw chain on its near side. Furthermore, a space 54 which is positioned above it, and which is set back to the near side in a U-shape as seen in side view, serves as a relief space for a slightly outwardly bulged portion 14C of an upper blade 14a of a cutter blade 14.

A central part of the upper plate face 52 protrudes forward to be the attachment plate face 52a having a substantial mountain-shape. An opening 55 is formed at a near side of a central surface of the attachment plate face 52a so as to make it possible to watch the cutter blade 14 from above.

At a location on the attachment plate 9 in front of the location where the screw is fixed, a projection 19a made of a shaft of a screw 19 is fixed projecting downwardly. The projection 19a projects into an arc-shaped notch 52b formed on an end of the attachment plate face 52a of the holding plate 5. The length of the notch 52b in the direction of the arc (certain range) is designed to be within a range which makes it possible to sharpen cutting edges of left and right cutter blades by controlling the sharpener body 1a to pivot to either left or right direction, with the holding plate 5 kept straddling and supporting the upper part of the saw chain. As the sharpener body 1a pivots left and right, the projection 19a moves within the notch 52b. Both ends of the notch 52b have a function as a stopper to restrict the movement of the projection 19a, in which when the projection 19a gets in contact with the stopper, the orientation of the grinding tool 4 coincides with the sharpening angle.

Most part of the grinding tool 4 projects horizontally (relative to the upper plate face 52) from the near side of the holding plate 5 into the forward-located opening 55. When the holding plate 5 is fitted into the saw chain, a side of the holding plate 5 is brought to a height to make it possible to sharpen a cutter blade of the saw chain. Furthermore, the projecting portion 9a is aligned in height with the upper plate face 52 of the holding plate 5, and is positioned near, along, above and on the right side of the grinding tool 4.

The left and right cutter blades have sharpening angles that are left-to-right symmetrical to each other in shape, in which the cutting angles are also oriented left-to-right symmetrically to each other. The sharpener 1 of the embodiment is designed to make it possible to do sharpening, adapted to the difference of these orientations, by turning around the sharpener body 1a to either direction, left or right. Each of the drawings of FIG. 4 and FIG. 5 shows, in plan view, a state in which it is used.

Figure 4A:
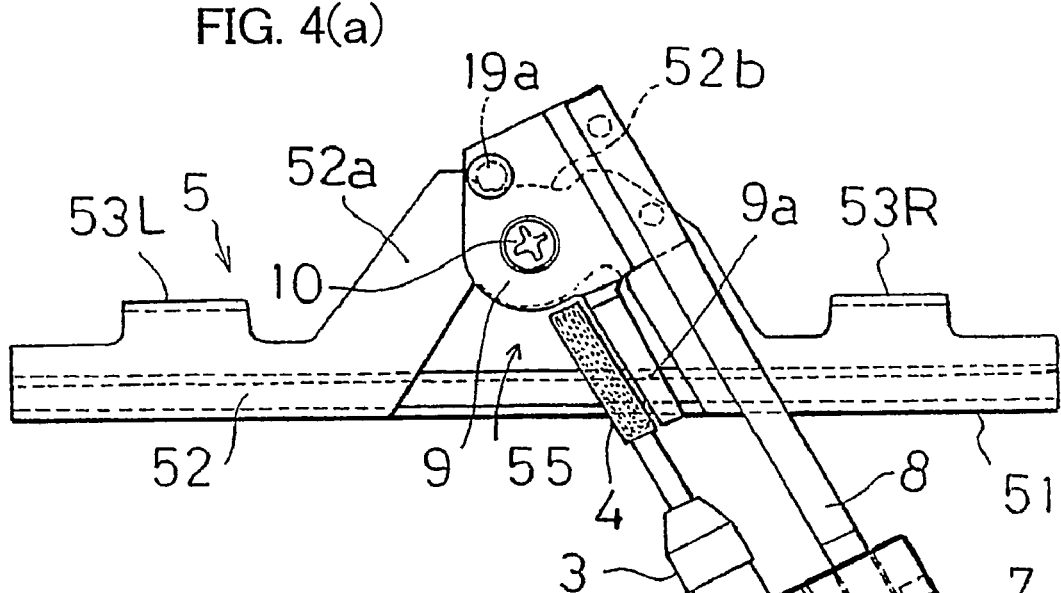
FIG. 4(a) is a plan view showing a state in which a sharpener body has been turned around in the horizontal rotational direction to one orientation.
Figure 4B:
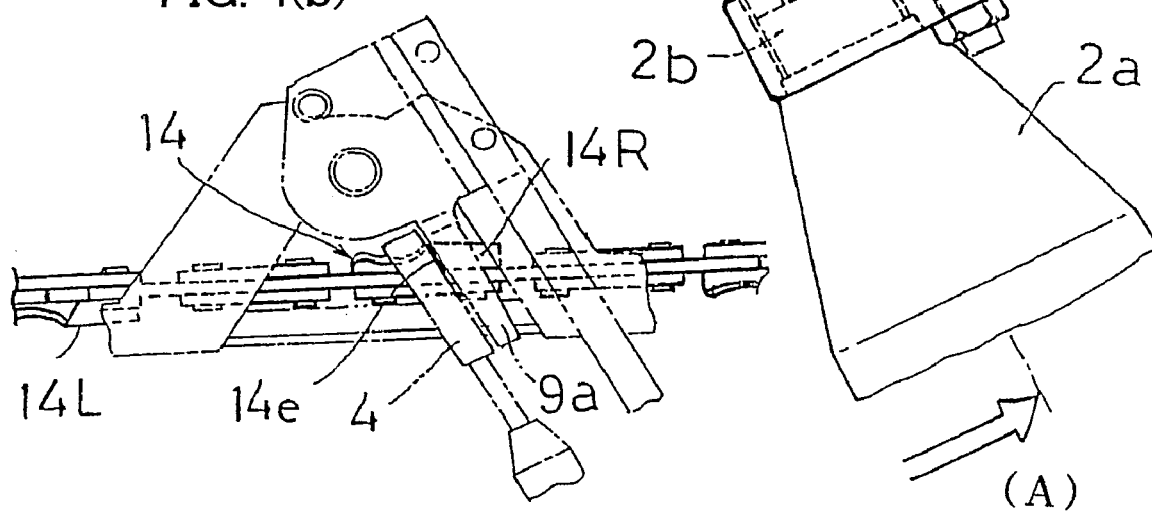
Figure 4C:
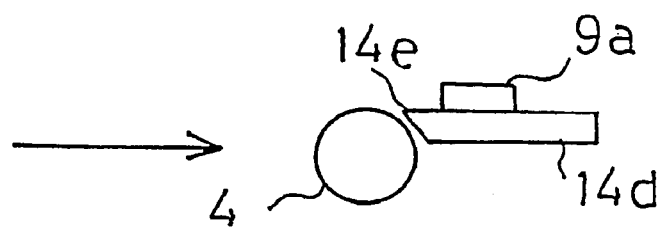
FIG. 4(c) is a simplified cross-sectional view showing a state in which a grinding tool is horizontally pivoted to face a cutting edge of the saw chain.
Figure 5A:
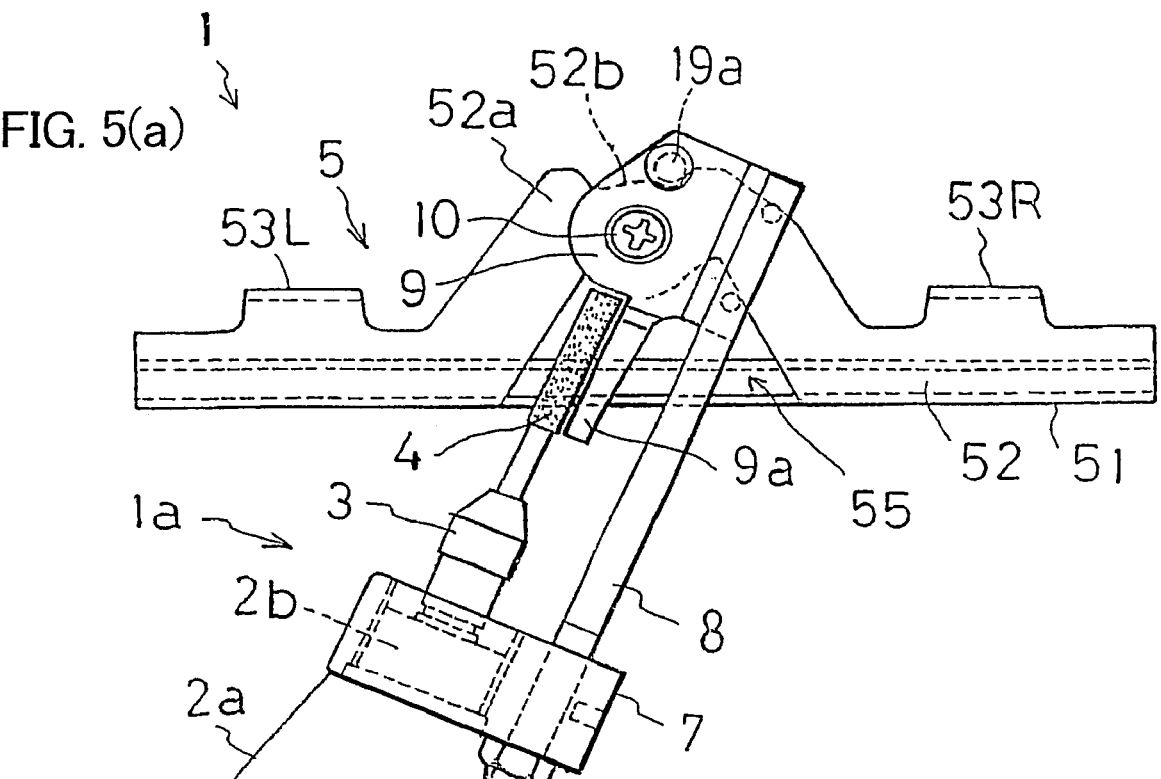
Figure 5B:
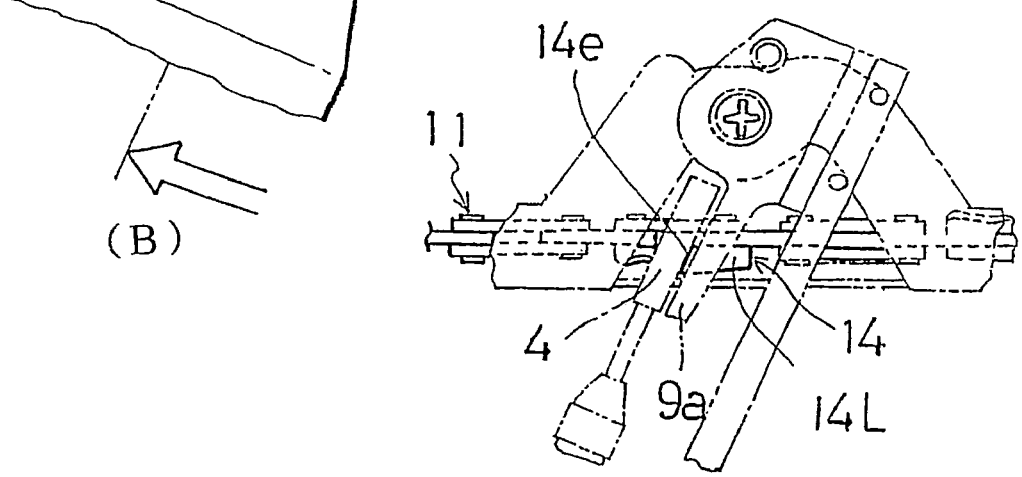
FIG. 5(b) is a plan view showing its main part in the state in which it is used.

FIG. 4(*a*) is a plan view showing a state in which the sharpener body 1a has been turned around in the horizontal rotational direction to one orientation, and (*b*) is a plan view showing its main part in the state in which it is used, while (*c*) is a simplified cross-sectional view showing a state in which the grinding tool is horizontally pivoted to face a cutting edge of the saw chain.

Figure 2B:
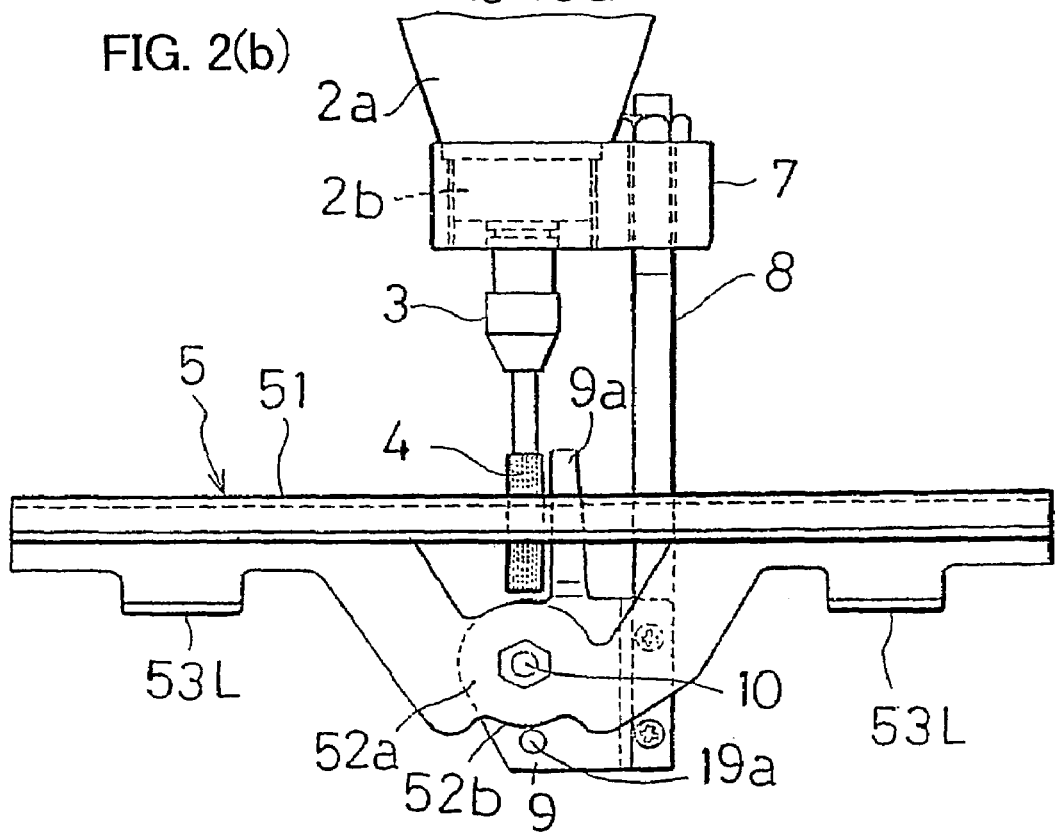
FIG. 2(b) is a bottom view similarly showing the main part.

When sharpening a cutter blade 14R on the near side, hold the case member 2a of the electric motor 2 by hand to turn the holding plate 5 to the direction of arrow (A) as shown in FIG. 4(*a*) from the orientation shown in each drawing of FIG. 2. With this posture, fit the holding plate 5 into and on the saw chain 11 from above the saw chain 11, and subject it to position alignment from above the opening 55 to align it with a sharpening angle of a cutting edge 14e of the upper blade 14a. Control the sharpener body 1a to pivot to the direction of arrow (A) until the projection 19a gets in contact with one end portion of the notch 52b.

In this way, with a force in the horizontal pivotal direction applied to the holding plate 5, the saw chain 11 can be clamped at both ends by the lower part face 51a of the vertical plate face 51 and the opposing vertical plate surface 53L in the holding plate 5, so as to fix the holding plate 5 to the saw chain 11. Here, as shown in FIG. 4(*c*), the height of a side of the grinding tool 4 is aligned with the height of the cutting edge 14e. Thus, by just turning the orientation of the sharpener body 1a) to the direction of arrow (A) shown in FIG. 4(*a*), it is grind and sharpen the cutting edge 14e, with a side of the grinding tool 4 rotating at a high speed.

FIG. 5(*a*) is a plan view showing a state in which the sharpener body 1a has been turned around to the other orientation, while the figure (*b*) is a plan view showing its main part in the state in which it is used.

As shown in FIGS. 5(*a*) and (*b*), when sharpening a cutter blade 14L on the far side (on the left side as seen from the saw chain), turn the holding plate 5 to the direction of arrow (B) shown in FIG. 5(*a*). With this posture, fit the holding plate 5 into and on the saw chain 11 from above the saw chain 11. Thereafter, subject it to sharpening in the same sharpening process as described above with reference to FIG. 4(*a*). Note that when alternately sharpening the left and right cutting edges of the saw chain 11, slightly lift up the holding plate 5 fitted into and on the saw chain 11, and shift the position of the holding plate 5 to a position where an upper blade 14a of the cutter blade 14L can be watched from above the opening 55 at the center of the holding plate 5. At this position, place the holding plate 5 on the saw chain 11, and control the sharpener body 1a to the direction of arrow (B) until the projection 19a gets in contact with the other end portion of the notch 52b.

In this way, with a force in the same direction applied to the holding plate 5, the grinding tool 4 can be oriented in the direction which is left-to-right symmetrical to the direction shown in FIGS. 4(*a*) and (*b*). With this posture, contact a side of the grinding tool 4, rotating at a high speed, to a cutting edge 14e, for grinding and sharpening.

It is possible to alternately sharpen the left and right cutter blades 14L, 14R. It is also possible to sharpen either the left or right cutter blades 14L (14R) together each time.

The sharpening is done by contacting the grinding tool 4, rotating at a high speed, to a cutting edge 14e, of the cutter blade 14, so that it is likely to produce chatter or wobble in the upper blade 14d. However, since the cutter blade 14 is pressed from above by the projecting portion 9a, the upper blade 14d is substantially prevented from chattering and wobbling.

The projecting portion 9a has a role, as well, to stop sparks and metal powder, produced by grinding, from flying upward, improving workability and safety.

Figure 6:
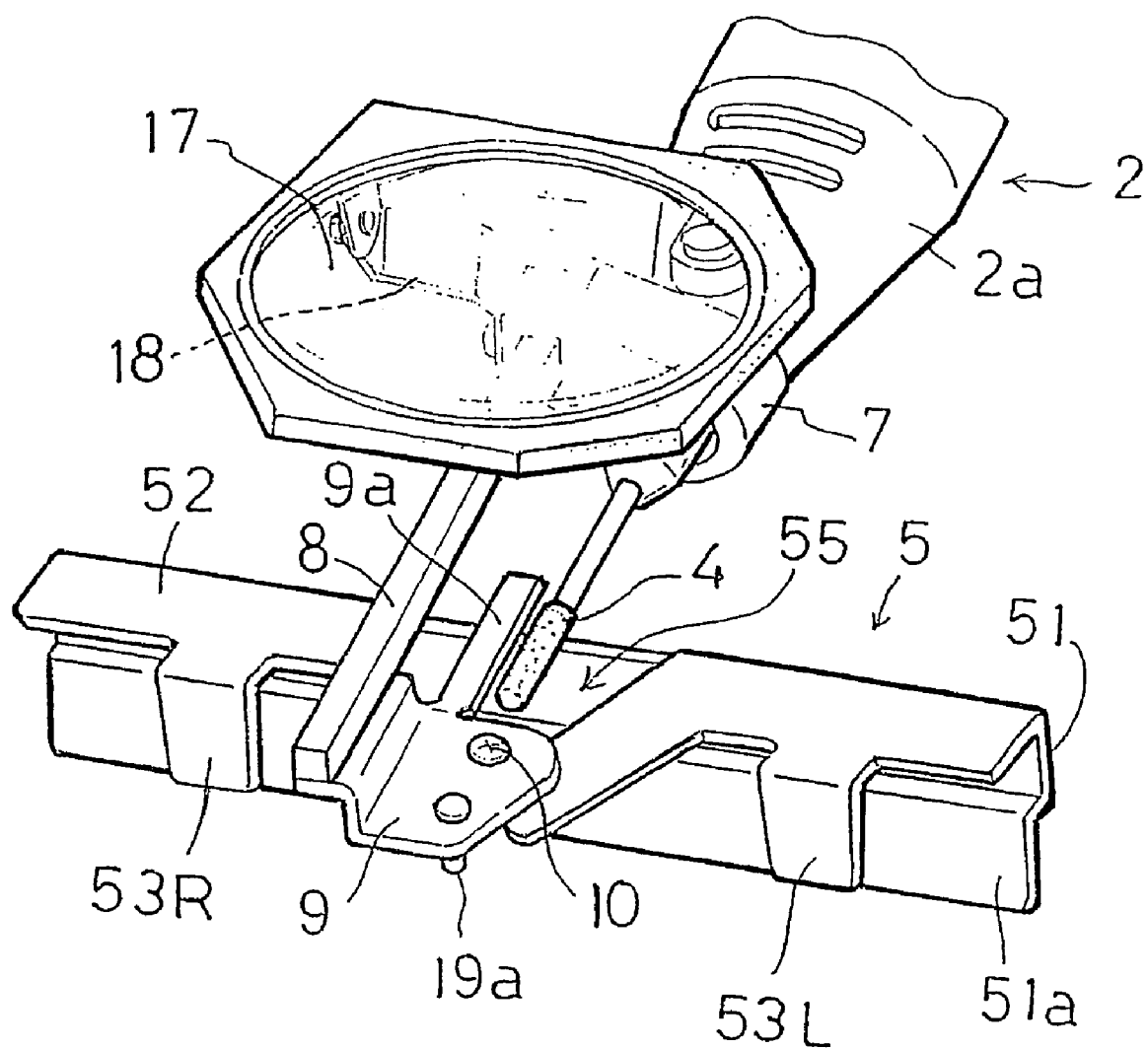
FIG. 6 is a perspective view showing a state in which a magnifying lens is attached to the sharpener of the embodiment of the present invention.

FIG. 6 is a perspective view showing a state in which a magnifying lens is attached to the sharpener 1 of the embodiment of the present invention. As shown in FIG. 6, a magnifying lens 17 is attached via an attachment arm 18 to the base 7 of the support member 6, which is attached to the end portion of the electric motor 2, so as to be detachable and laterally movable. With the magnifying lens 17 thus provided, it is possible to sharpen a cutting edge while seeing it magnified.

INDUSTRIAL APPLICABILITY

The saw chain sharpener according to the present invention is to sharpen a cutting edge of a saw chain provided in a chainsaw by grinding or abrading. It is small in size and easy to use, and enables sharpening of left and right blades of the saw chain, by just controlling the orientation of the electric motor, held by a single hand, to be oriented in either left or right horizontal direction. Further, it has a construction which makes it easy to define an angular position of grinding, and makes it unlikely for wobbling to be produced during grinding work. Thus, not only an expert but also a person having no experience in sharpening can do the sharpening well, so that so that not only new demand, but also replacement of conventional products can be expected.

The invention claimed is:

1. A saw chain sharpener comprising:
   a sharpener body with an electric motor;
   a round shaft-shaped grinding tool attached to an end of the electric motor:
   a support member projected forward from the sharpener body:
   a projecting portion provided on a front end portion of the support member or on an attachment plate attached to the front end portion of the support member; and
   a holding plate attached forward of the saw chain sharpener and having a shape to be able to straddle and support an upper part of a saw chain, the holding plate having a vertical plate face having a long left-to-right length extending in a direction along the saw chain, an upper plate face placed on the upper part of the saw chain, and opposing vertical plate surfaces formed at leftward and rightward locations of the upper plate face; wherein
   the holding plate is supported on the front end portion of the support member or on the attachment plate so as to be horizontally rotatable in a certain range for orientation to align with a sharpening angle of a cutter blade positioned left or right of the saw chain to grind the cutter blade;
   the saw chain is clamped at both ends by a lower part face of the vertical plate face and the opposing vertical plate surfaces;
   the upper plate surface of the holding plate has an opening formed at a center thereof so as to make it possible to watch the grinding tool and the cutter blade from above; and
   the projecting portion having a thin width shape is aligned in height with the upper plate face of the holding plate, in which the projection portion fixes a cutting edge of the cutter blade to define an accurate cutting edge angle and presses an upper blade of the cutter blade from above to prevent the upper blade from wobbling caused by grinding.

* * * * *